(12) United States Patent
Seo

(10) Patent No.: US 7,123,078 B2
(45) Date of Patent: *Oct. 17, 2006

(54) BOOSTING VOLTAGE CONTROL CIRCUIT

(75) Inventor: Sung Whan Seo, Kyungki-Do (KR)

(73) Assignee: Hynix Semiconductor Inc., Gyunggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/978,728

(22) Filed: Nov. 1, 2004

(65) Prior Publication Data

US 2005/0062518 A1 Mar. 24, 2005

Related U.S. Application Data

(63) Continuation of application No. 10/615,046, filed on Jul. 8, 2003, now Pat. No. 6,812,775.

(30) Foreign Application Priority Data

Oct. 7, 2002 (KR) .............................. 2002-60998

(51) Int. Cl.
G05F 1/10 (2006.01)
G05F 3/02 (2006.01)

(52) U.S. Cl. .................................................. 327/536

(58) Field of Classification Search ................ 327/536, 327/589; 365/226; 363/59–60
See application file for complete search history.

(56) References Cited

U.S. PATENT DOCUMENTS

| 5,006,974 | A  | * | 4/1991 | Kazerounian et al. ......... 363/60 |
| 5,553,030 | A  | * | 9/1996 | Tedrow et al. ............... 365/226 |
| 6,154,411 | A  | * | 11/2000 | Morishita .................... 365/226 |
| 6,184,745 | B1 | * | 2/2001 | Kim ............................ 327/541 |
| 6,377,113 | B1 | * | 4/2002 | Kanno ......................... 327/543 |
| 6,567,309 | B1 | * | 5/2003 | Tanzawa ................ 365/185.18 |
| 6,891,426 | B1 | * | 5/2005 | Zeng et al. .................. 327/536 |

FOREIGN PATENT DOCUMENTS

KR        10-0225851        7/1999

* cited by examiner

*Primary Examiner*—Quan Tra
(74) *Attorney, Agent, or Firm*—Marshall, Gerstein & Borun LLP

(57) ABSTRACT

A boosting voltage control circuit includes a first charge pump coupled to an output node, and a second charge pump coupled to the output node, the second charge pump having an enable input to enable the second charge pump. The boosting voltage control circuit also includes a regulation circuit coupled to the output node, and a clock generator coupled to the regulation circuit, the first charge pump, and the second charge pump.

18 Claims, 6 Drawing Sheets

BOOSTING VOLTAGE CONTROL CIRCUIT

CROSS-REFERENCE TO RELATED APPLICATION

This application is a continuation application of U.S. patent application Ser. No. 10/615,046, filed on Jul. 8, 2003 now U.S. Pat. No. 6,812,775, entitled "BOOSTING VOLTAGE CONTROL CIRCUIT," which is hereby incorporated by reference herein in its entirety.

BACKGROUND

1. Field of the Disclosure

The present disclosure relates to a boosting voltage control circuit for use in memory devices.

2. Background of the Related Art

In a flash memory device of a low power supply voltage, voltage boosting is performed in order to boost a word line gate voltage of the cell every time the read operation of the cell is performed. In other words, boosting is to boost a low power supply voltage (VCC) to a voltage level that could be used for the read operation. Generally, the boosting operation raises a voltage of 0V to 5.3V if a read command is inputted from the outside. However, in raising the voltage from 0V to 5.3V, lots of time is taken due to various delay components such as a RC delay, etc. within the boosting circuit.

SUMMARY OF THE DISCLOSURE

In one aspect, a boosting voltage control circuit is provided. The boosting voltage control circuit comprises a first charge pump coupled to an output node, and a second charge pump coupled to the output node, the second charge pump having an enable input to enable the second charge pump. The boosting voltage control circuit also comprises a regulation circuit coupled to the output node, and a clock generator coupled to the regulation circuit, the first charge pump, and the second charge pump.

In another aspect in which a boosting voltage control circuit includes a charge pump coupled to an output node, and having a clock generator coupled to a regulation circuit and the charge pump, the regulation circuit comprises a voltage divider coupled to the output node, and a reference voltage generator to generate a reference voltage based on an input voltage. The regulation circuit additionally comprises an input voltage generator to generate the input voltage based on trim bits, and a control signal generator to generate a control signal based on an output of the voltage divider and the reference voltage, the control signal for controlling the clock generator.

BRIEF DESCRIPTION OF THE DRAWINGS

The above and other objects, features and advantages of embodiments of the present invention will be apparent from the following detailed description of embodiments of the invention in conjunction with the accompanying drawings, in which.

DETAILED DESCRIPTION

Figure 1:
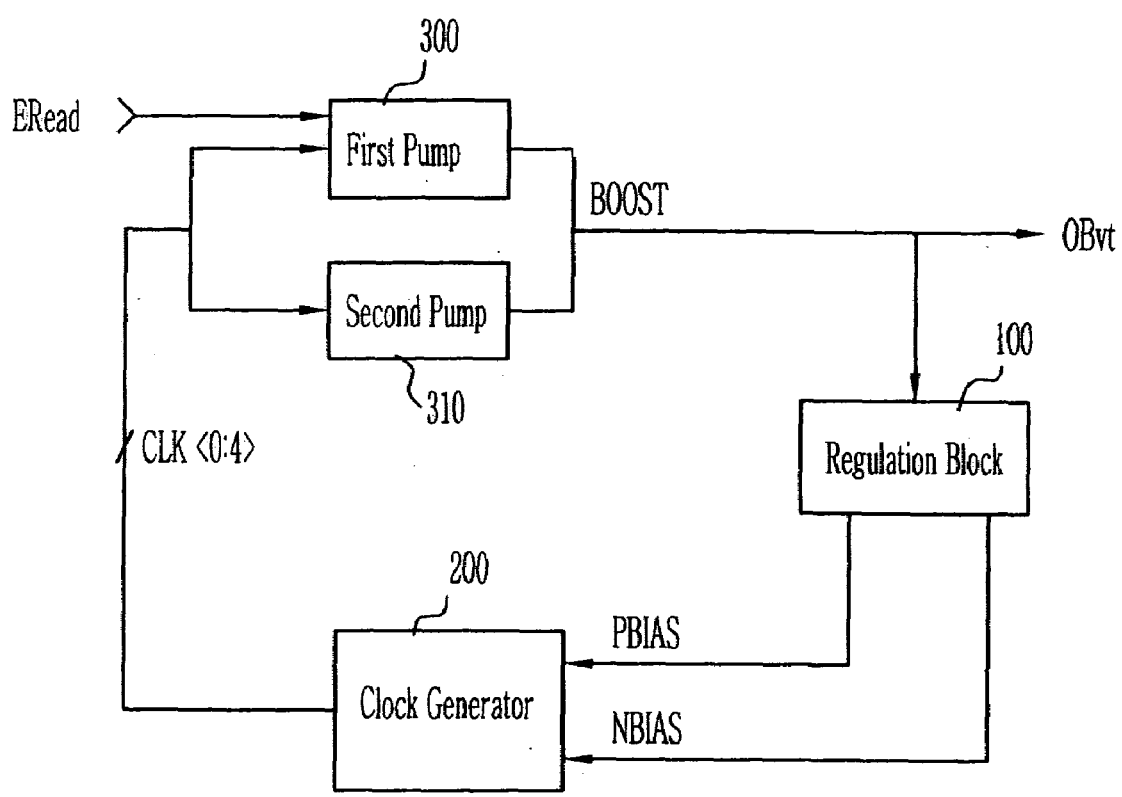
FIG. 1 is a block diagram of a boosting voltage control circuit according to the present invention for explaining the entire structure and operation of the circuit.

Reference will now be made in detail to the preferred embodiments of the present invention, examples of which are illustrated in the accompanying drawings, in which like reference numerals are used to identify the same or similar parts. FIG. 1 is a block diagram of a boosting voltage control circuit according to the present invention for explaining the entire structure and operation of the circuit.

Referring to FIG. 1, a regulation block 100 is coupled between a boosting voltage output OBvt and a clock generator 200. First and second pumps 300 and 310 are connected in parallel between the clock generator 200 and the boosting voltage output OBvt. The first pump 300 is driven by an external read enable signal ERead.

An operation of the voltage regulation circuit constructed above will be below described.

The second pump 310 generates a boosting voltage BOOST of a constant level according to clock signals CLK<0:4> of the clock generator 200 in a standby state as well as a read state. The first pump 300 generates the boosting voltage BOOST of a constant level according to the external read enable signal ERead and the clock signals CLK<0:4> of the clock generator 200. The regulation block 100 compares the boosting voltage BOOST with the reference voltage generated by an internal trim bit and then outputs first and second clock control signals PBIAS and NBIAS for keeping the boosting voltage BOOST outputted from the first and second pumps 300 and 310 to be a constant level. The clock generator 200 controls the first and second pumps 300 and 310 by changing the period of the clock signals CLK<0:4> depending on the first, and second clock control signals PBIAS and NBIAS.

In the present invention, while the regulation block 100 senses the boosting voltage BOOST at the output terminal as an output feedback mode, if any abnormality occurs in the boosting voltage BOOST, the regulation block 100 controls the clock signal CLK being the output of the clock generator 200 using the first and second clock control signals PBIAS and NBIAS being the output of the regulation block 100, thereby controlling the first and second pumps 300 and 310 to control the outputted boosting voltage BOOST.

The first pump 300 is a first boosting means for boosting the word line gate voltage when the read operation of the device is performed. The second pump 310 is a second boosting means for generating the boosting voltage normally in order to shorten time taken to boost the word line gate voltage. As more current is consumed during the read state rather than the standby state, the first and second pumps 300 and 310 are positioned. In other words, in the standby state, only the second pump 310 operates to generate a low current and a boosting voltage of a constant level. If a read command is inputted, the first and second pumps 300 and 310 operate to supply a high current and a boosting voltage of a constant level. Thereby, it is possible to reduce the read time of the device and the power consumption of the standby state.

The regulation block 100 for comparing the levels of the boosting voltages BOOST to output the first and second clock control signals PBIAS and NBIAS will be now described.

Figure 2:
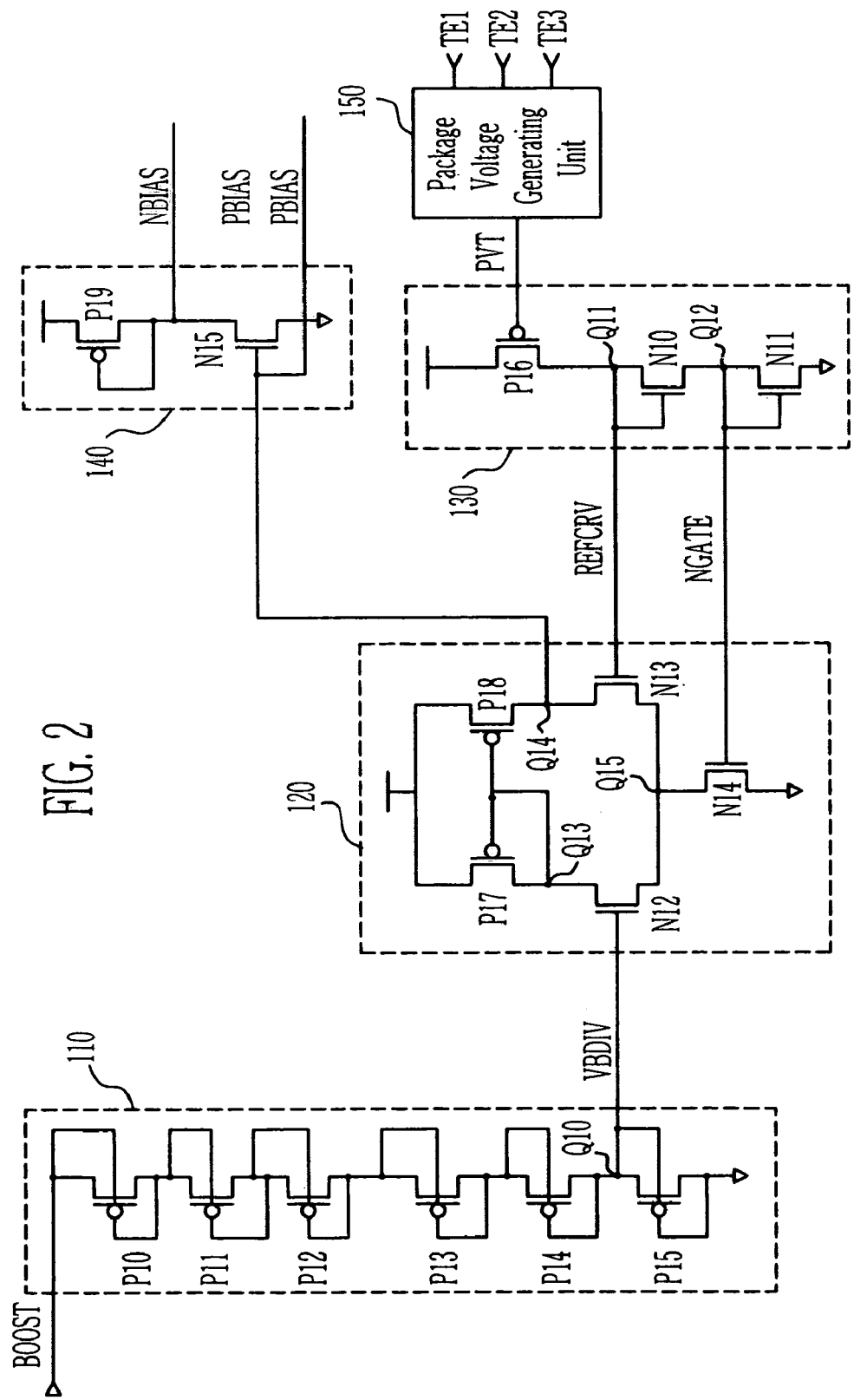
FIG. 2 is a circuit diagram of a regulation block according to the present invention for explaining the construction and operation of the block.

FIG. 2 is a circuit diagram of a regulation block according to the present invention for explaining the construction and operation of the block.

Referring to FIG. 2, the regulation block 100 comprises a boosting voltage dividing unit 110, a compare unit 120, a reference voltage generating unit 130, a clock control signal output unit 140 and a package voltage generating unit 150. The input of the boosting voltage dividing unit 110 is connected to the boosting voltage output OBvt in FIG. 1 and its output is connected to a first compare signal VBDIV input of the compare unit 120. The input of the reference voltage generating unit 130 is connected to the output of the package voltage generating unit 150. First and second outputs of the reference voltage generating unit 130 are connected to a second compare signal REFCRV input and a control signal NGATE input of the compare unit 120, respectively. The output of the compare unit 120 is connected to the input of the clock control signal output unit 140. The input of the clock control signal output unit 140 is connected to the output of the compare unit 120. First and second outputs of the clock control signal output unit 140 is connected to the input of the clock generator 200. First and third inputs of the package voltage generating unit 150 are connected to external trim bits TE1 through TE3, respectively, and the output of the package voltage generating unit 150 is connected to the input of the reference voltage generating unit 130.

The operation and construction of the regulation block having the above connection relationship will be described in detail by reference to FIG. 3. A term 'diode-connected transistor' to be described in the later means that a transistor in which one of the gate terminal, the source terminal and the drain terminal is connected operates as a diode.

The boosting voltage dividing unit 110 comprises tenth~fifteenth PMOS transistors P10 through P15 which are diode-connected. In concrete, each of the tenth~fifteenth PMOS transistors P10 through P15 gate terminals of which are connected to the source terminals thereof is sequentially serially connected between the boosting voltage input terminal OBvt and the ground VSS. In other words, the drain terminal of the tenth PMOS transistor P10 is connected to the boosting voltage input terminal OBvt. The source terminal of the tenth PMOS transistor P10 is connected to the drain terminal of the eleventh PMOS transistor P11. The source terminal of the eleventh PMOS transistor P11 is connected to the drain terminal of the twelfth PMOS transistor P12. The source terminal of the twelfth PMOS transistor P12 is connected to the drain terminal of the thirteenth PMOS transistor P13. The source terminal of the thirteenth PMOS transistor P13 is connected to the drain terminal of the fourteenth PMOS transistor P14. The source terminal of the fourteenth PMOS transistor P14 is connected to a tenth node Q10. The drain terminal of the fifteenth PMOS transistor P15 is also connected to the tenth node Q10. The source terminal of the fifteenth PMOS transistor P15 is connected to the ground VSS.

The reference voltage generating unit 130 comprises tenth and eleventh NMOS transistors N10 and N11 which are diode-connected to a sixteenth PMOS transistor P16. In concrete, the sixteenth PMOS transistor P16 driven by a package voltage PVT being the output of the package voltage generating unit 150 is connected between the power supply voltage VCC and an eleventh node Q11. The tenth NMOS transistor N1 drain and gate terminals of which are connected is connected between the eleventh node Q11 and a twelfth node Q12. The eleventh NMOS transistor N11 drain and gate terminals of which are connected is connected between the twelfth node Q12 and the ground VSS.

The compare unit 120 comprises a differential amplifier having seventeenth and eighteenth PMOS transistors P17 and P18 and twelfth~thirteenth NMOS transistors N12 and N13, and a fourteenth NMOS transistor N14 for driving the differential amplifier. In concrete, the seventeenth PMOS transistor P17 is connected to the power supply voltage VCC and a thirteenth node Q13 and is driven by the potential of the thirteenth node Q13. The eighteenth PMOS transistor P18 is connected to the power supply voltage VCC and a fourteenth node Q14 and is driven by the potential of the thirteenth node Q13. The twelfth NMOS transistor N12 is connected between the thirteenth node Q13 and the fifteenth node Q15, and is driven by the tenth node Q10 (output of the boosting voltage dividing means; VBDIV). The thirteenth NMOS transistor N13 is connected between the fourteenth node Q14 and the fifteenth node Q15, and is driven by an eleventh node Q11 (output of the compare reference voltage generating means; REFCRV). The fourteenth NMOS transistor N14 is connected between the fifteenth node Q15 and the ground VSS and is driven by the potential of a twelfth node Q12.

The clock control signal output unit 140 comprises a nineteenth PMOS transistor P19 and a fifteenth NMOS transistor N15. The nineteenth PMOS transistor P19 and the fifteenth NMOS transistor N15, which are diode-connected, are connected between the power supply voltage VCC and the ground VSS. In concrete, the nineteenth PMOS transistor P19 the gate terminal of which is connected to the source terminal thereof is connected to the power supply voltage VCC and the output terminal of the second clock control signal NBIAS. The fifteenth NMOS transistor N15 is connected between the output terminal of the first clock control signal PBIAS and the ground terminal VSS, and is driven by the potential of the fourteenth node Q14.

The operation of the regulation block constructed above will be below described.

The boosting voltage dividing unit 110 drops the boosting voltage BOOST inputted through the tenth~fifteenth PMOS transistors P10 through P15 which are diode-connected. The unit 110n outputs the first compare signal VBDIV being the boosting voltage, which was dropped, to the first compare signal VBDIV input terminal of the compare unit 120. For example, if the boosting voltage BOOST is 9V, the voltage applied to both ends of each of the tenth~fifteenth PMOS transistors P10 through P15 becomes 1.5V. The voltage applied to both end of the fifteenth PMOS transistor P15 becomes a voltage that the boosting voltage BOOST is divided equally by 6, i.e., 1.5V.

The reference voltage generating unit 130 divides the power supply voltage VCC through the sixteenth PMOS transistor P16, and the tenth and eleventh NMOS transistors N10 and N11 to generate the second compare signal REFCRV for comparing the level of the boosting voltage and the control signal NGATE for controlling the operation of the compare unit 120. In concrete, the voltage applied to both ends of the sixteenth PMOS transistor P16 is changed by the package voltage PVT being the output of the package voltage generating unit 150. Thereby, the voltage levels of the second compare signal REFCRV being the output of the reference voltage generating unit 130 and the control signal NGATE are changed. This is because as the channel width of the sixteenth first6 PMOS transistor P16 is adjusted according to the package voltage signal PVT, the voltage applied to the sixteenth PMOS transistor P16 is changed. The remaining voltage subtracted from the voltage applied to both ends of the sixteenth PMOS transistor P16 in the power supply voltage is divided into two parts by the tenth and eleventh NMOS transistors N10 and N11. Thereby, the voltage of the eleventh and twelfth nodes Q11 and Q12 is adjusted by controlling the voltage applied to both ends of the sixteenth PMOS transistor P16. For example, assuming that the power supply voltage VCC is 5V and the voltage applied to the sixteenth PMOS transistor P16 is 1V by the package voltage signal PVT, 2V is applied to the eleventh node Q11 and the twelfth node Q12, respectively, by means of the tenth and eleventh NMOS transistors N10 and N1.

The compare unit 120 generates a compare result signal being the output of the compare unit 120 according to the first compare signal VBDIV being the output of the boosting voltage dividing unit 110 and the second compare signal REFCRV being the output of the reference voltage generating unit 130. In more detail, the fourteenth NMOS transistor N14 is turned on by the control signal NGATE of the reference voltage generating unit 130 to drive the differential amplifier. At this time, the output is decided by the difference between the two inputs depending on a characteristic of the differential amplifier. In other words, a logical status of the fourteenth node Q14 is changed by the different in the voltage between the first compare signal VBDIV inputted to the gate terminal of the twelfth NMOS transistor N12 and the second compare signal REFCRV inputted to the gate terminal of the thirteenth NMOS transistor N13. For example, if the voltage of the tenth node Q10 is lower than that of the eleventh node Q11, the fourteenth node Q14 outputs a signal of a logical Low status. On the contrary, if the voltage of the tenth node Q10 is higher than that of the eleventh node Q11, the fourteenth node Q14 outputs a signal of a logical High status.

The clock control signal output unit 140 changes the logical status of the first and second clock control signals PBIAS and NBIAS output terminal using the compare result signal being the output of the compare unit 120. In other words, the compare result signal being the output of the compare unit 120 becomes the first clock control signal PBIAS and controls the fifteenth NMOS transistor N15. While the power supply voltage VCC having a logical status High by the nineteenth PMOS transistor P19 is applied to the output terminal of the second clock control signal NBIAS, its value is changed depending on whether the fifteenth NMOS transistor N15 operates. In concrete, if the compare result signal being the output of the fourteenth node Q14 becomes a logical High, the fifteenth NMOS transistor N15 is turned on and the logical status of the second clock control signal NBIAS is thus changed to a logical Low. Further, if the compare result signal being the output of the fourteenth node Q14 become a logical Low, the fifteenth NMOS transistor N15 is turned off and the logical status of the second clock control signal NBIAS is thus changed to a logical High.

As described above, the logical status of the first and second clock control signals are decided by the different between the first and second compare signals. This necessitates generation of the second compare signal of a constant level in order to control the boosting voltage. For this, the package voltage generating unit 150 controls the level of the second compare signal by controlling the channel width of the sixteenth PMOS transistor P16 within the reference voltage generating unit using the package voltage signal PVT, which will be described by reference to FIG. 3.

Figure 3A:
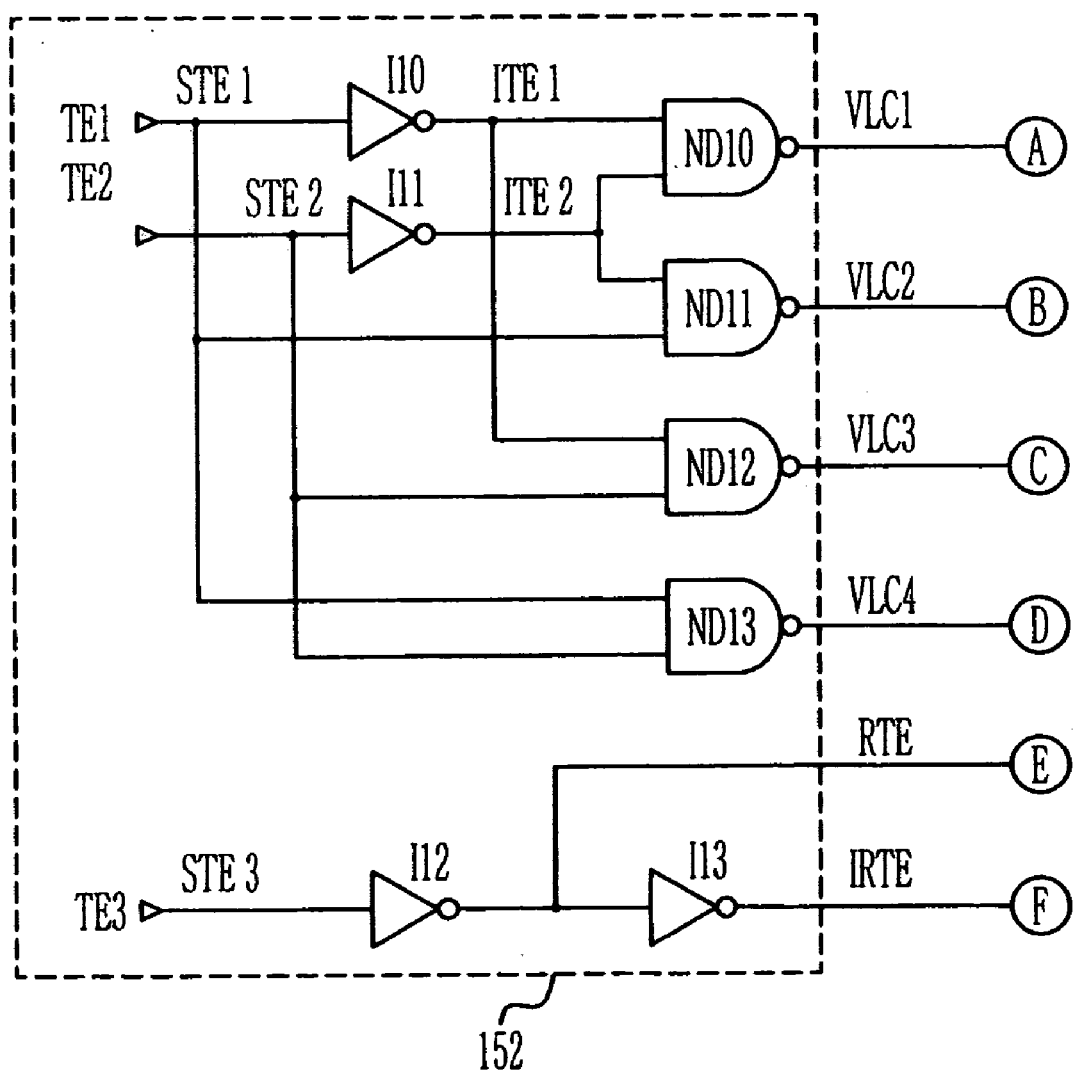
FIG. 3A~FIG. 3C are circuit diagrams of a package voltage generating unit according to the present invention for explaining the construction and operation of the unit.
Figure 3B:
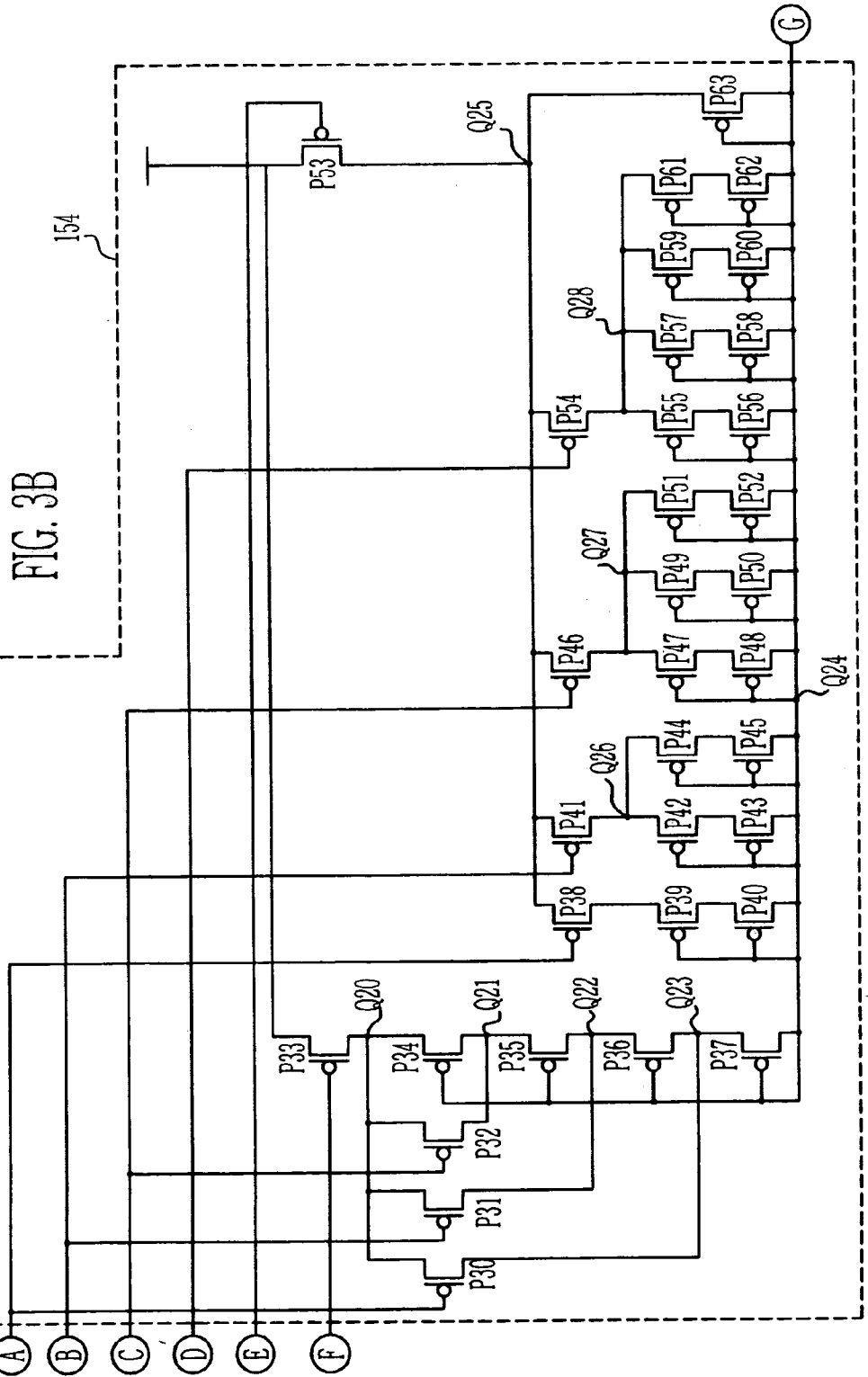
Figure 3C:
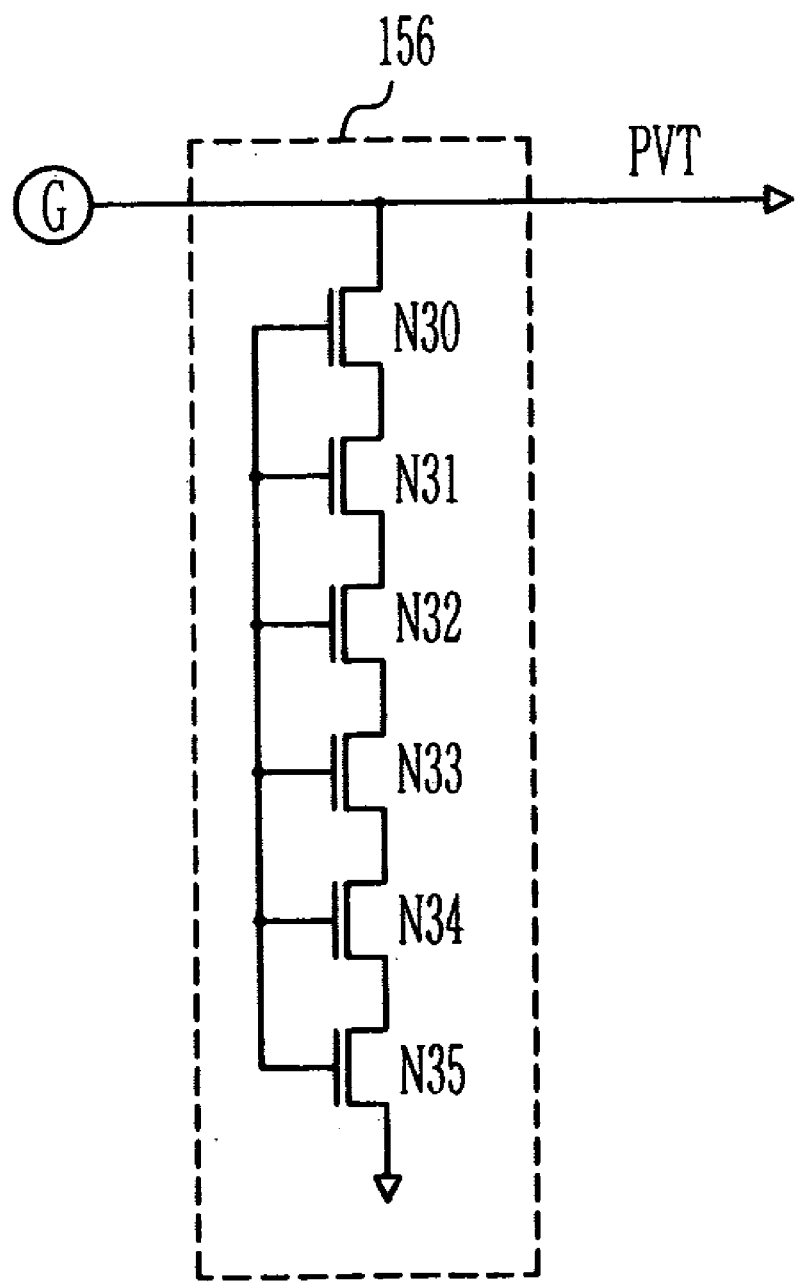

FIG. 3A~FIG. 3C are circuit diagrams of the package voltage generating unit according to the present invention for explaining the construction and operation of the unit.

Referring to FIG. 3A~FIG. 3C, the package voltage generating unit 150 comprises a trim bit input unit (see 152 in FIG. 3A), a voltage level converting unit (see 154 in FIG. 3B) and a package voltage output unit (see 156 in FIG. 3C). The trim bit input unit 152, the voltage level converting unit 154 and the package voltage output unit 156 are serially connected. 'A', 'B', 'C', 'D', 'E' and 'F' in FIG. 3A sequentially correspond to 'A', 'B', 'C', 'D', 'E' and 'F' in FIG. 3B, respectively. 'G' in FIG. 3B corresponds to 'G' in FIG. 3C.

The trim bit input unit 152 outputs control signals of a plurality of levels depending on external trim bits to control the voltage level converting unit 154. The voltage level converting unit 154 outputs voltages of various levels using the level control signal being the output of the trim bit input unit. The package voltage output unit 156 serves to prevent leakage of the output voltage of the voltage level converting unit 154 and outputs the package voltage signal PVT to the reference voltage generating unit 130.

The package voltage generating unit of the present invention comprises the trim bit input unit 152, the voltage level converting unit 154 and the package voltage output unit 156. The trim bit input unit 152 comprises tenth~thirteenth inverters 110 through 113 and tenth~thirteenth NAND gates ND10 through ND13. The voltage level converting unit 154 comprises thirtieth~sixtieth PMOS transistors P30 through P63. The package voltage output unit 156 comprises thirtieth~thirty-fifth NMOS transistors N30 through N35.

The trim bit input unit (FIG. 3A), the voltage level converting unit (FIG. 3B) and the package voltage output unit (FIG. 3C) will be below described in detail by reference to the accompanying drawings.

A first trim bit input terminal TE1 is connected to a first input terminal of the tenth NAND gate ND10 via the tenth inverter I10 and is also connected to a first input terminal of the twelfth NAND gate ND12. Further, the first trim bit input terminal TE1 is connected to a second input terminal of the eleventh NAND gate ND12 and a first input terminal of the thirteenth NAND gate ND13.

A second trim bit input terminal TE2 is connected to the second input terminal of the tenth NAND gate ND10 via the eleventh inverter I11 and is also connected to the first input terminal of the eleventh NAND gate ND11. Also, the second trim bit input terminal TE2 is connected to the second input terminals of the twelfth and thirteenth NAND gates ND12 and ND13.

A third trim bit input terminal TE3 is connected to the gate terminal of the fifty-third PMOS transistor P53 via the twelfth inverter I12. Further, the third trim bit input terminal TE3 is connected to the gate terminal of the thirty-third PMOS transistor P33 via the twelfth and thirteenth inverters I12 and I13.

The output terminal of the tenth NAND gate ND10 is connected to the gate terminals of the thirtieth and thirty-eighth PMOS transistors P30 and P38. The output terminal of the eleventh NAND gate ND11 is connected to the gate terminals of the thirty-first and forty-first PMOS transistors P31 and P41. The output terminal of the twelfth NAND gate ND12 is connected to the gate terminals of the thirty-second and forth-sixth PMOS transistors P32 and P46. The output terminal of the thirteenth NAND gate ND13 is connected to the gate terminal of the fifth-fourth PMOS transistor P54.

The thirty-third PMOS transistor P33 is connected between the power supply voltage VCC and the twentieth node Q20. The fifty-third PMOS transistor P53 is connected between the power supply voltage VCC and the twenty-fifth node Q25. The thirtieth PMOS transistor P30 is connected between the twentieth node Q20 and the twenty-third node Q23. The thirty-first PMOS transistor P31 is connected between the twentieth node Q20 and the twenty-second node Q22. The thirty-second PMOS transistor P32 is connected between the twentieth node Q20 and the twenty-first node Q21.

The thirty-fourth PMOS transistor P34 is connected between the twentieth node Q20 and the twenty-first node Q21. The thirty-fifth PMOS transistor P35 is connected between the twenty-first node Q21 and the twenty-second node Q22. The thirty-sixth PMOS transistor P36 is connected between the twenty-second node Q22 and the twenty-third node Q23. The thirty-seventh PMOS transistor P37 is connected between the twenty-third node Q23 and the twenty-fourth node Q24. This means that the thirty-fourth~thirty-seventh PMOS transistors P34 through P37 are serially connected between the twentieth node Q20 and the twenty-fourth node Q24. Further, the gate terminals of the thirty-fourth~thirty-seventh PMOS transistors P34 through P37 are connected to the twenty-fourth node Q24, respectively.

The thirty-eighth~fortieth PMOS transistors P38 through P40 are serially connected between the twenty-fourth node Q24 and the twenty-fifth node Q25. Each of the gate terminals of the thirty-ninth and fortieth PMOS transistors P39 and P40 are connected to the twenty-fourth node Q24.

The forty-first PMOS transistor P41 is connected between the twenty-fifth and twenty-sixth nodes Q25 and Q26. The forty-second and forty-third PMOS transistors P42 and P43 are serially connected between the twenty-fourth and twenty-sixth nodes Q24 and Q26. The gate terminals of the forty-second and forty-third PMOS transistors P42 and P43 are driven by the twenty-fourth node Q24. Further, the forty-fourth and forty-fifth PMOS transistors P44 and P45 are serially connected between the twenty-second and twenty-sixth nodes Q24 and Q26. The gate terminals of the forty-fourth and forty-fifth PMOS transistors P44 and P45 are driven by the twenty-fourth node Q24. In other words, the forty-second and forty-third PMOS transistors P42 and P43 and the forty-fourth and forty-fifth PMOS transistors P44 and P45, which are serially connected, are connected in parallel between the twenty-fourth and twenty-sixth nodes Q24 and Q26.

The forty-sixth PMOS transistor P46 is connected between the twenty-fifth and twenty-seventh nodes Q25 and Q27. Each of the forty-seventh and forty-eighth PMOS transistors P47 and P48, the forty-ninth and fiftieth PMOS transistors P49 and P50, and the fifty-first and fifty-second PMOS transistors P51 and P52 is serially connected between the twenty-fourth and twenty-seventh nodes Q24 and Q27. Each of the forty-seventh~fifty-second PMOS transistors P47 through P52 is driven by the twenty-fourth node Q24. The forty-seventh and forty-eighth PMOS transistors P47 and P48, the forty-ninth and fiftieth PMOS transistors P49 and P50, and the fifty-first and fifth-second PMOS transistors P51 and P52, each of which is serially connected, is connected in parallel between the twenty-four and twenty-seventh nodes Q24 and Q27.

The fifty-fourth PMOS transistor P54 is connected between the twenty-fifth and twenty-eighth nodes Q25 and Q28. Each of the fifth-fifth and fifty-sixth PMOS transistors P55 and P56, the fifty-seventh and fifty-eighth PMOS transistors P57 and P58, the fifty-ninth and sixtieth PMOS transistors P59 and P60) and the sixty-first and sixth-second PMOS transistors P61 and P62 is serially connected between the twenty-fourth and twenty-eighth nodes Q24 and Q28. Each of the fifth-fifth~sixty-second PMOS transistors P55 through P62 is driven by the twenty-fourth node Q24. The fifty-fifth and fifty-sixth PMOS transistors P55 and P56, the fifty-seventh and fifty-eighth PMOS transistors P57 and P58, the fifty-ninth and sixtieth PMOS transistors P59 and P60, and the sixty-first and sixty-second PMOS transistors P61 and P62, each of which is serially connected, is connected in parallel between the twenty-fourth and twenty-eighth nodes Q24 and Q28. The sixty-third PMOS transistor P63 is connected between the twenty-second Q24 and the twenty-fifth node Q25. The gate terminal is connected to the twenty-fourth node Q24.

The thirtieth~thirty-fifth NMOS transistors N30 through N35 are serially connected between the twenty-fourth node ('G' in FIG. 3B and FIG. 3C, Q24) and the ground VSS. Each of the gate terminals of the thirtieth~thirty-fifth NMOS transistors N30 through N35 are connected to the ground VSS.

The operation of the package voltage generating unit 150 constructed above, for using the external trim bits to output the package voltages of various levels, will be below described.

A first trim bit signal STE1 of the first trim bit input terminal TE1 is applied to the input terminals of the eleventh and thirteenth NAND gates ND11 and ND13. Next, the first trim bit signal STE1 is inverted by the tenth inverter 110 and is then applied to the input terminals of the tenth and twelfth NAND gates ND10 and ND12.

A second trim bit signal STE2 of the second trim bit input terminal TE2 is applied to the input terminals of the twelfth and thirteenth NAND gates ND12 and ND13. Next, the second trim bit signal STE2 is inverted by the eleventh inverter I11 and is then applied to the input terminals of the tenth and eleventh NAND gates ND10 and ND11.

The tenth NAND gate ND10 logically combines the first and second trim bit signals STE1 and STE2, which were inverted, and then outputs a first voltage level control signal VLC1 to the gate terminal of the thirtieth and thirty-eighth PMOS transistors P30 and P38. The eleventh NAND gate ND11 logically combines the second trim bit signal STE2 and the first trim bit signal STE1, which were inverted, and them outputs a second voltage level control signal VLC2 to the gate terminal of the thirty-first and forty-first PMOS transistors P31 and P41. The twelfth NAND gate ND12 logically combines the first trim bit signal STE1 and the second trim bit signal STE2, which were inverted, and then outputs a third voltage level control signal VLC3 to the gate terminal of the thirty-second and forty-sixth PMOS transistors P32 and P46. The thirteenth NAND gate ND13 logically combines the first and second trim bit signals STE1 and STE2 and then output a fourth voltage level control signal VLC4 to the gate terminal of the forty-fourth PMOS transistor P54.

For example, if both logical status of the first and second trim bit signals STE1 and STE2 are Low, the tenth NAND gate ND10 outputs the first voltage level control signal VLC1 having a Low status, and the eleventh~thirteenth NAND gates ND11 through N13 outputs the second~fourth voltage level control signals VLC2 through VLC4 having a High status, respectively. Further, if the logical status of the first and second trim bit signals STE1 and STE2 are High and Low, respectively, the eleventh NAND gate ND11 outputs the second-voltage level control signal VLC2 having a Low status. Also, if a logical status of each of the first and second trim bit signals STE1 and STE2 is Low and High, the twelfth NAND gate ND12 outputs the third voltage level control signal VLC3 having a Low status. If a logical status of the first and second trim bit signals STE1 and STE2 is all Low, the thirteenth NAND gate ND13 outputs he fourth voltage level control signal VLC4 having a Low status.

The third trim bit signal STE3 in the third trim bit input terminal TE3 is inverted by the twelfth inverter I12 (first path control signal; RTE) and then applied to the fifty-third PMOS transistor P53. Further, the third trim bit signal STE3 inverted by the twelfth inverter I12 is inverted by the thirteenth inverter I13 (second path control signal; IRTE) and then applied to the thirty-third PMOS transistor P33. The path of the power supply voltage VCC is adjusted by controlling the thirty-third and the fifty-third PMOS transistors P33 and P53 within the voltage level converting unit 154 by means of the third trim bit signal STE3.

In more detail, if the third trim bit signal STE3 of a logical High is inputted, the first path control signal RTE of an inverted Low status is outputted by the twelfth inverter I12, and the second path control signal IRTE of a logical High is outputted by the thirteenth inverter I13. Accordingly, the fifty-third PMOS transistor P53 is driven by the first path control signal RTE and the power supply voltage VCC is thus applied to the twenty-fifth node Q25. If the third trim bit signal TE3 of a logical Low is inputted, the first path control signal RTE of a logical High is outputted by the twelfth inverter I12, and the second path control signal IRTE of a logical Low is outputted by the thirteenth inverter I13. Accordingly, the thirty-third PMOS transistor P33 is driven by the second path control signal IRTE and the power supply voltage VCC is thus applied to the twentieth node Q20.

By means of the first~fourth voltage level control signals VLC1 through VLC4 and the first and second path control signals RTE and IRTE, the voltage level converting unit 154 outputs package voltage signals of first~seventh voltage levels.

A case that the fifty-third PMOS transistor P53 is turned off by the second path control signal IRTE and the thirty-third PMOS transistor P33 is turned on, will be first examined. The voltages of the first~third voltage levels are applied to the output terminals by means of the first~third voltage level control signals VLC1 through VLC3.

In concrete, the thirtieth PMOS transistor P30 is turned on by the first voltage level control signal VLC1. A voltage is dropped and divided by the thirty-third, the thirtieth and the thirty-seventh PMOS transistors P33, P30 and P37, and a voltage of the first voltage level is thus applied to the output terminal. The thirty-first PMOS transistor P31 is turned on by the second voltage level control signal VLC2. A voltage is dropped and divided by the thirty-third and the thirty-first PMOS transistors P33 and P31 and the thirty-sixth and the thirty-seventh PMOS transistors P36 and P37, and a voltage of the second voltage level is thus applied to the output terminal. The thirty-second PMOS transistor P32 is turned on by the third voltage level control signal VLC3. A voltage is dropped and divided by the thirty-third and thirty-second PMOS transistors P33 and P32 and the thirty-fifth and thirty-seventh PMOS transistors P35 through P37, and a voltage of the third voltage level is thus applied to the output terminal.

A case that the thirty-third PMOS transistor P33 is turned off by the first path control signal RTE and the fifty-third PMOS transistor P53 is turned off, will be first examined. The voltages of the fourth~seventh voltage levels are applied to the output terminals by means of the first~fourth voltage level control signals VLC1 through VLC4.

In concrete, the thirty-eighth PMOS transistor P38 is turned on by the first voltage level control signal VLC1. A voltage is dropped and divided by the fifth-third and thirty-eighth PMOS transistors P53 and P38, the thirty-ninth and fortieth PMOS transistors P39 and P40, and the sixty-third PMOS transistor P63, and a voltage of the fourth voltage level is thus applied to the output terminal. The forty-first PMOS transistor P41 is turned on by the second voltage level control signal VLC2. A voltage is dropped and divided by the fifty-third and forty-first PMOS transistors P53 and P41, the forty-second and forty-third PMOS transistors P42 and P43, the forty-fourth and forty-fifth PMOS transistors P44 and P45, and the sixty-third PMOS transistor P63, and a voltage of the fifth voltage level is thus applied to the output terminal. The forty-sixth PMOS transistor P46 is turned on by the third voltage level control signal VLC3. A voltage is dropped and divided by the fifty-third and forty-third PMOS transistors P53 and P46, the forty-seventh and forty-eighth PMOS transistors P47 and P48, the forty-ninth and fiftieth PMOS transistors P49 and P50, the fifty-first and fifty-second. PMOS transistors P51 and P52, and the sixty-third PMOS transistor P63, and a voltage of the sixth voltage level is applied to the output terminal. The fifty-fourth PMOS transistor P54 is turned on by the fourth voltage level control signal VLC4. A voltage is dropped and divided by the fifty-third and fifty-fourth PMOS transistors P53 and P54, the fifty-fifth and fifty-sixth PMOS transistors P55 and P56, the fifty-seventh and fifty-eighth PMOS transistors P57 and P58, the fifty-ninth and sixtieth PMOS transistors P59 and P60, the sixty-first and sixty-second PMOS transistors P61 and P62, and the sixty-third PMOS transistor P63, and a voltage of the seventh voltage level is thus applied to the output terminal. In other words, the number of the PMOS transistors connected in parallel depending on the turned-on status of the thirty-eighth, forty-first, forty-sixth and fifty-fourth PMOS transistors P38, P41, P46 and P54. Thereby, voltages and currents of various levels are outputted.

The output unit 156 has a leakage current using the thirtieth~thirty-third NMOS transistors N30 through N35 and outputs the first~seventh voltage level signals PVT being the output of the voltage level converting unit 154 to the compare reference voltage generating means 130.

The second compare reference signal REFCRV and the control signal NGATE, being the outputs of the reference voltage generating unit 130, are changed by the package voltage PVT (first~seventh voltage levels) outputted from the package voltage generating unit 150 having the above construction and operation. It is thus possible to variably set the reference voltage (second compare reference signal REFCRV) for controlling the boosting voltage to be a given level.

As described above, the regulation block 100 compares the reference voltage internally generated and the inputted boosting voltage. The regulating block 100 then changes the logical status of the first and second clock control signals PBIAS and NBIAS for controlling the clock generator 200, depending on whether the level of the inputted boosting voltage is higher or lower than that of the reference voltage. As such, the regulation block 100 controls the clock generator 200 to control the level of the boosting voltage.

The clock generator 200 controlled by the first and second clock control signals PBIAS and NBIAS from the regulation block 100 will be described.

Figure 4:
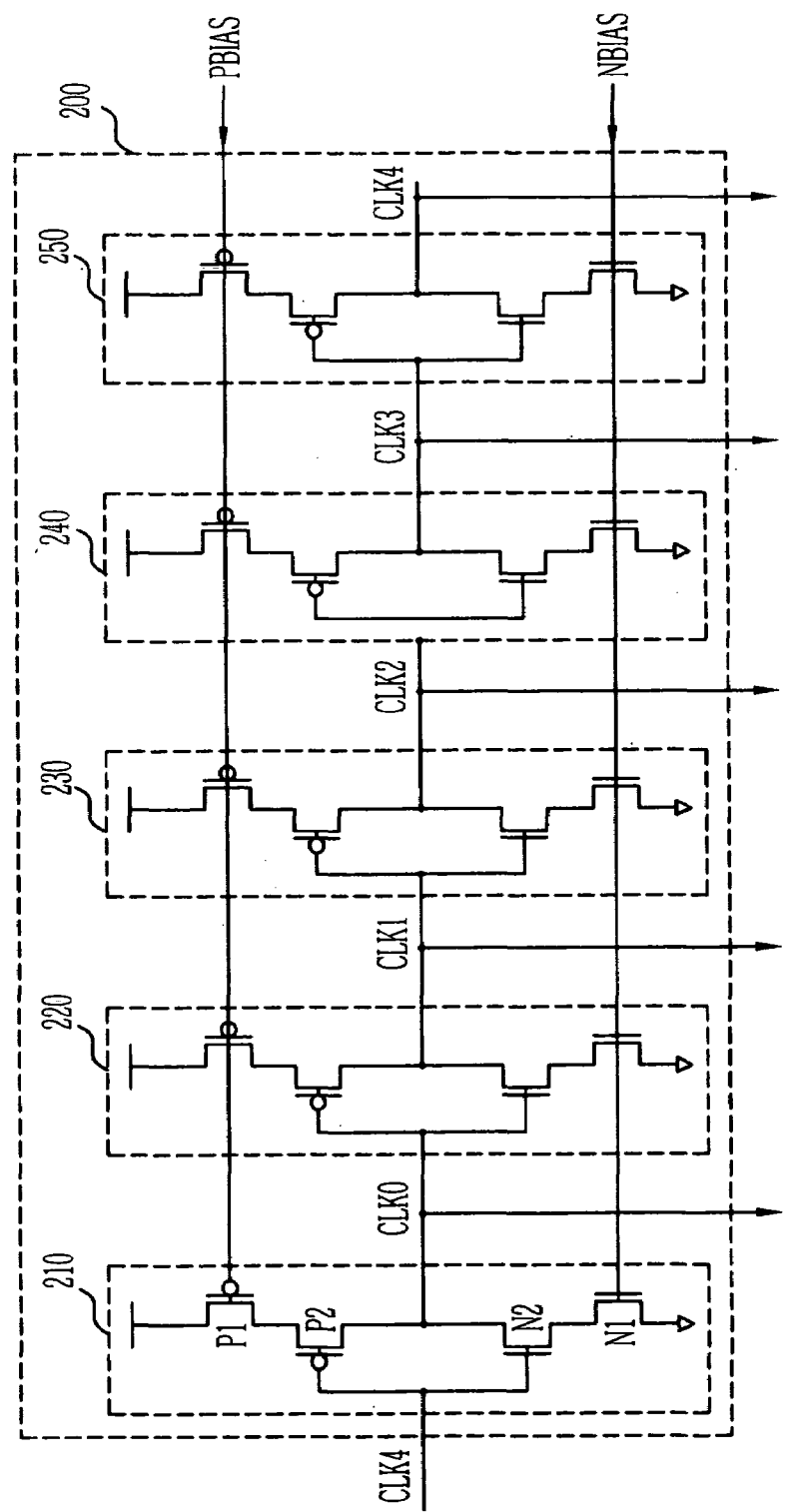
FIG. 4 is a circuit diagram of a clock generator according to the present invention for explaining the construction and operation of the generator.

FIG. 4 is a circuit diagram of the clock generator according to the present invention for explaining the construction and operation of the generator.

Referring to FIG. 4, the clock generator 200 comprises first~fifth clock generating units 210 through 250. Each of the first~fifth clock generating units 210 through 250 is connected to the external first and second clock control signals PBIAS and NBIAS. The output terminals of the first~fifth clock generating units 210 through 250 are connected to the input terminals of their front stages, thus forming a loop.

The first~fifth clock generating units 210 through 250 have the same construction. Therefore, only the first clock generating unit 210 will be explained in order to avoid redundancy.

The first clock generating unit 210 has a first PMOS transistor P1 driven by the external first clock control signal PBIAS and a second PMOS transistor P2 driven by a fifth clock output terminal CLK4, which are serially connected between the power supply voltage VCC and a first clock signal CLK0 output terminal. The first clock generation unit 210 further comprises a first NMOS transistor N1 driven by the second clock control signal NBIAS and a second NMOS transistor N2 driven by the fifth clock output terminal CLK4, which are serially connected between the first clock signal CLK0 output terminal and the ground VSS.

In other words, the first PMOS transistor P1, the second PMOS transistor P2, the second NMOS transistor N2 and the first NMOS transistor N1 are sequentially serially connected between the power supply voltage VCC and the ground VSS. At this time, the first PMOS transistor P1 and the first NMOS transistor N1 are each driven by the first and second clock control signals PBIAS and NBIAS. Also, the second PMOS transistor P2 and the second NMOS transistor N2 are driven by the output signal of the fifth clock signal CLK4 output terminal being the output of the fifth clock generating unit 250.

The operation of the above clock generator will be now described.

The first PMOS transistor P1 is turned on or off by the first clock control signal PBIAS to control application of the power supply voltage VCC of a logical High status to the drain terminal of the second PMOS transistor P2. Further, the first NMOS transistor N1 is turned on or off by the second clock control signal NBIAS to control application of the ground VSS of a logical Low status to the drain terminal of the second NMOS transistor N2.

At this time, either the second PMOS transistor P2 or the second NMOS transistor N2 is turned by the logical status of the fifth clock signal CLK4 being the output of the fifth clock generating unit 250, thus outputting the first clock signal CLK0 having an opposite logical status to the fifth clock signal CLK4 to the output terminal of the first clock generating unit 210. In other words, the first~fifth clock generating units 210 through 250 output logical signals having opposite logical status to the output signal of the front stage.

In concrete, when the initial logical status of the first~fifth clock signals CLK0 through CLK4 are High, Low, High, Low and High, and the first and second clock control signals PBIAS and NBIAS are applied with Low and High, will be examined as follows.

As described above, the first PMOS and first NMOS transistors P1 and N1 in the first clock generating unit 210 are turned on by the first and second clock control signals PBIAS and NBIAS. Further, the second NMOS transistor N2 is turned on by the fifth clock signal CLK4 of a logical High status. Thereby, the first clock generating unit 210 receives the fifth clock signal CLK4 of the logical High status to output the first clock signal CLK0 of a logical Low status. The second clock generating unit 220 receives the first clock signal CLK0 of the logical Low status to output the second clock signal CLK1 of a logical High status. The third clock generating unit 230 receives the second clock signal CLK1 of the logical High status to output the third clock signal CLK2 of a logical Low status. The fourth clock generating unit 240 receives, the third clock signal CLK2 of the logical Low status to output the fourth clock signal CLK3 of a logical High status. The fifth clock generating unit 250 receives the fourth clock signal CLK3 of the logical High status to output the fifth clock signal CLK4 of a logical Low status. The first clock generating unit 210 receives the, fifth clock signal CLK4 of the logical Low status to output the first clock signal CLK0 of a logical High status.

Examining the logical status of the first clock signal CLK0, it could be understood that the logical status is continuously changed from High to Low and vice versa. The first~fifth clock generating units 210 through 250 output the first~fifth clock signals CLK0 through CLK4 of a given frequency to control the first and second pumps 300 and 310.

At this time, if a signal of a logical High status is inputted to the first clock control signal PBIAS or a signal of a logical Low status is inputted to the second clock control signal NBIAS, the first PMOS transistor P1 is turned off or the second NMOS transistor N2 is turned off. Thereby, as the clock signals of the first~fifth clock generating units 210 through 250 constantly keep a given logical status, it is possible to control the clock cycle.

As described above, according to the present invention, a trim bit is used to control the level of the PVT voltage and to control the compare reference voltage generating unit. Further, the boosting voltage is controlled by comparing the dropped boosting voltage and the reference voltage of the compare reference voltage generating unit. Therefore, the present invention has an advantageous effect that it can stably control the boosting voltage with a low power.

Further, a stable boosting voltage could be kept normally. Therefore, the present invention has a new effect that it can improve the speed of the read operation of the device.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A boosting voltage control circuit, comprising:
   a first charge pump coupled to an output node and operated in a read state of a memory device;
   a second charge pump coupled to the output node, the second charge pump being operated in a standby state and the read state of the memory device;
   a regulation circuit coupled to the output node; and
   a clock generator coupled to the regulation circuit, the first charge pump, and the second charge pump,
   wherein the first charge pump and the second charge pump are coupled in parallel between the clock generator and the output node,
   wherein the regulation circuit comprises:
   a first voltage divider coupled to the output node to divide a voltage of the output node;
   a reference voltage generator to generate a reference voltage and a control voltage based on an input voltage;
   an input voltage generator to generate the input voltage based on trim bits;

a control signal generator to generate a control signal based on an output of the voltage divider, the control voltage, and the reference voltage, the control signal for controlling the clock generator.

2. A boosting voltage control circuit according to claim 1, wherein a first output of the regulation circuit is coupled to a first input of the clock generator, and wherein a second output of the regulation circuit is coupled to a second input of the clock generator.

3. A boosting voltage control circuit according to claim 1, wherein the first voltage divider comprises a plurality of transistors coupled in series.

4. A boosting voltage control circuit according to claim 1, wherein the control signal generator comprises a compare circuit to compare an output of the first voltage divider to the reference voltage.

5. A boosting voltage control circuit according to claim 1, wherein the compare circuit comprises a differential amplifier.

6. A boosting voltage control circuit according to claim 1, wherein the reference voltage generator comprises a second voltage divider to generate the reference voltage.

7. A boosting voltage control circuit according to claim 6, wherein the second voltage divider comprises a plurality of transistors coupled in series.

8. A boosting voltage control circuit according to claim 6, wherein the second voltage divider is configured to generate the reference voltage based on the input voltage.

9. A boosting voltage control circuit according to claim 1, wherein the regulation circuit further comprises a clock control signal generator circuit coupled to the compare circuit and to the clock generator.

10. A boosting voltage control circuit according to claim 9, wherein the clock control signal generator circuit is configured to generate first and second clock control signals.

11. A regulation circuit for a boosting voltage control circuit, the boosting voltage control circuit having a charge pump coupled to an output node, and having a clock generator coupled to the regulation circuit and the charge pump, the regulation circuit comprising:
a voltage divider coupled to the output node;
a reference voltage generator to generate a reference voltage and a control voltage based on an input voltage;
an input voltage generator to generate the input voltage based on trim bits;
a control signal generator to generate a control signal based on an output of the voltage divider, the control voltage, and the reference voltage, the control signal to control the clock generator.

12. A regulation circuit according to claim 11, wherein the input voltage generator comprises: a logic circuit to generate a plurality of control signals based on a plurality of trim bit signals; and a voltage level generating circuit coupled to the logic circuit, the voltage level generating circuit to generate the input voltage based on the plurality of control signals.

13. A regulation circuit according to claim 12, wherein the logic circuit comprises: a first inverter coupled to a first trim bit input terminal; a second inverter coupled to a second trim bit input terminal; a first NAND gate coupled to an output of the first inverter and an output of the second inverter to generate a first control signal of the plurality of control signals; a second NAND gate coupled to the output of the second inverter and the first trim bit input terminal to generate a second control signal of the plurality of control signals; a third NAND gate coupled to the output of the first inverter and the second trim bit input terminal to generate a third control signal of the plurality of control signals; a fourth NAND gate coupled to the first and second trim bit input terminals to generate a fourth control signal of the plurality of control signals; a third inverter coupled to a third trim bit input terminal to generate a fifth control signal of the plurality of control signals; and a fourth inverter coupled to an output of the third inverter to generate a sixth control signal of the plurality of control signals.

14. A regulation circuit according to claim 12, wherein the voltage level generating circuit comprises a plurality of PMOS transistors.

15. A regulation circuit according to claim 11, wherein the voltage divider comprises a plurality of transistors coupled in series.

16. A regulation circuit according to claim 11, wherein the control signal generator comprises a compare circuit coupled to the output of the voltage divider and the reference voltage, the compare circuit to generate the control signal.

17. A regulation circuit according to claim 16, wherein the compare circuit comprises a differential amplifier.

18. A boosting voltage control circuit according to claim 1, wherein the clock generator includes a plurality of clock signal inputs, wherein each clock signal output is coupled to a corresponding input of the first charge pump and a corresponding input of the second charge pump.

* * * * *